United States Patent

[11] 3,590,324

| [72] | Inventor | George D. Rockefeller, Jr.<br>Morris Plains, N.J. |
|---|---|---|
| [21] | Appl No. | 837,242 |
| [22] | Filed | June 27, 1969 |
| [45] | Patented | June 29, 1971 |
| [73] | Assignee | Westinghouse Electric Corporation<br>Pittsburgh, Pa. |

[54] PHASE COMPARISON RELAYING NETWORK
17 Claims, 15 Drawing Figs.
[52] U.S. Cl.................................................. 317/28,
317/27, 317/39
[51] Int. Cl....................................................... H02h 3/28,
H02h 7/26
[50] Field of Search........................................... 317/27, 28,
38, 36

[56] References Cited
UNITED STATES PATENTS

| 2,879,454 | 3/1959 | Hodges et al. | 317/28 |
| 3,295,019 | 12/1966 | Alfather | 317/27 |
| 3,312,866 | 4/1967 | Rockefeller | 317/28 |
| 3,470,418 | 9/1969 | Hagberg et al. | 317/28 |

Primary Examiner—Hilton O. Hirshfield
Assistant Examiner—Ulysses Weldon
Attorneys—A T Stratton, C L. Freedman and John L Stoughton ABSTRACT: A protective relaying apparatus especially useful in protecting a line section of a transmission line in which the line section has at least first and second terminals connected through first and second breaker switches to busses at first and second switching stations and in which operating information of the line section is transmitted between the first and second stations. The relaying apparatus at, at least the first station, embodies a pair of fault sensors in which a first thereof is actuated due to the occurrence of faults in at least that portion of the protected transmission line section and beyond and which sensor is effective to actuate the breaker switch associated therewith solely when the information supplied to the apparatus indicates the fault to be within the protected line section. The second fault sensor is actuated in response to the occurrence of faults which occur solely in a predetermined fractional portion of the protected line section and independently of the information supplied to the apparatus from any other station to actuate the adjacent breaker switch and to transmit information advising the second station of the actuation of the second fault sensor at the first station.

OVERCURRENT RELAY

OR

TRIP RELAY

SQUELCH

PHASE COMPARISON RELAYING NETWORK

BACKGROUND OF THE INVENTION

Where the output voltage of a sequence filter used in phase comparison relaying is a function of more than one sequence line current, blind spots can exist which interfere with tripping during an internal fault. This occurs when the proportion of sequence currents is widely different at the various line terminals. In particular, the large zero-sequence impedance of long lines limits the zero-sequence line current flow at one station when the fault is close to the other station.

Aside from any blind-spot question, faster response to faults can be had with instantaneous overcurrent units. When such an overcurrent relay or unit is set to operate at high-current faults which are above any normal line current, this fast operation is most desirable. In such an overcurrent actuated relaying network, with the overcurrent unit set for such high-fault current, the line impedance may well limit the fault current from a remote bus to a magnitude which is less than the current magnitude to which it is feasible to have the remote overcurrent relay actuate. Under these conditions the breaker controlling network at the remote terminal must be informed quickly that the local breaker has been actuated for opening by the local breaker controlling network. In accordance with this invention, this information is supplied to the remote breaker controlling network by squelching the local transmitter after a predetermined time interval subsequent to the operation of the overcurrent relay. As will be pointed out below, the magnitude of this delay should not be too short since such a too short delay will actually result in a lengthening of the time required to trip the remote breaker. Similarly, if the delay is too great, an undue lengthening of the remote breaker operating time will result.

Squelch circuits have been used in prior art phase comparison relaying networks to squelch the operation of the transmitter for a predetermined interval after initiation of the opening of the local breaker. This insures the opening of other line terminals which either do not see the fault or the fault current is very low until one or both of the other breakers open. An example of such a network is illustrated in Altfather Pat. No. 3,295,019, dated Dec. 27, 1966. In such relaying networks the squelching of the transmitter occurs without any intentional delay for the fastest response at the opposite line terminal or station.

It is an object of my invention to provide a phase comparison relaying network which will operate to trip the protecting breakers when the fault produces a blind spot.

A further object is to provide such a relaying network which will trip the remote breaker in the minimum time when the fault is close to the local breaker.

A still further object is to provide in such a system time delay actuated squelching of the local transmitter to speed the actuation of the remote breaker.

Other objects and advantages of the present invention will become apparent in view of the specification, the appended claims and the drawings in which drawings;

Figure 1:
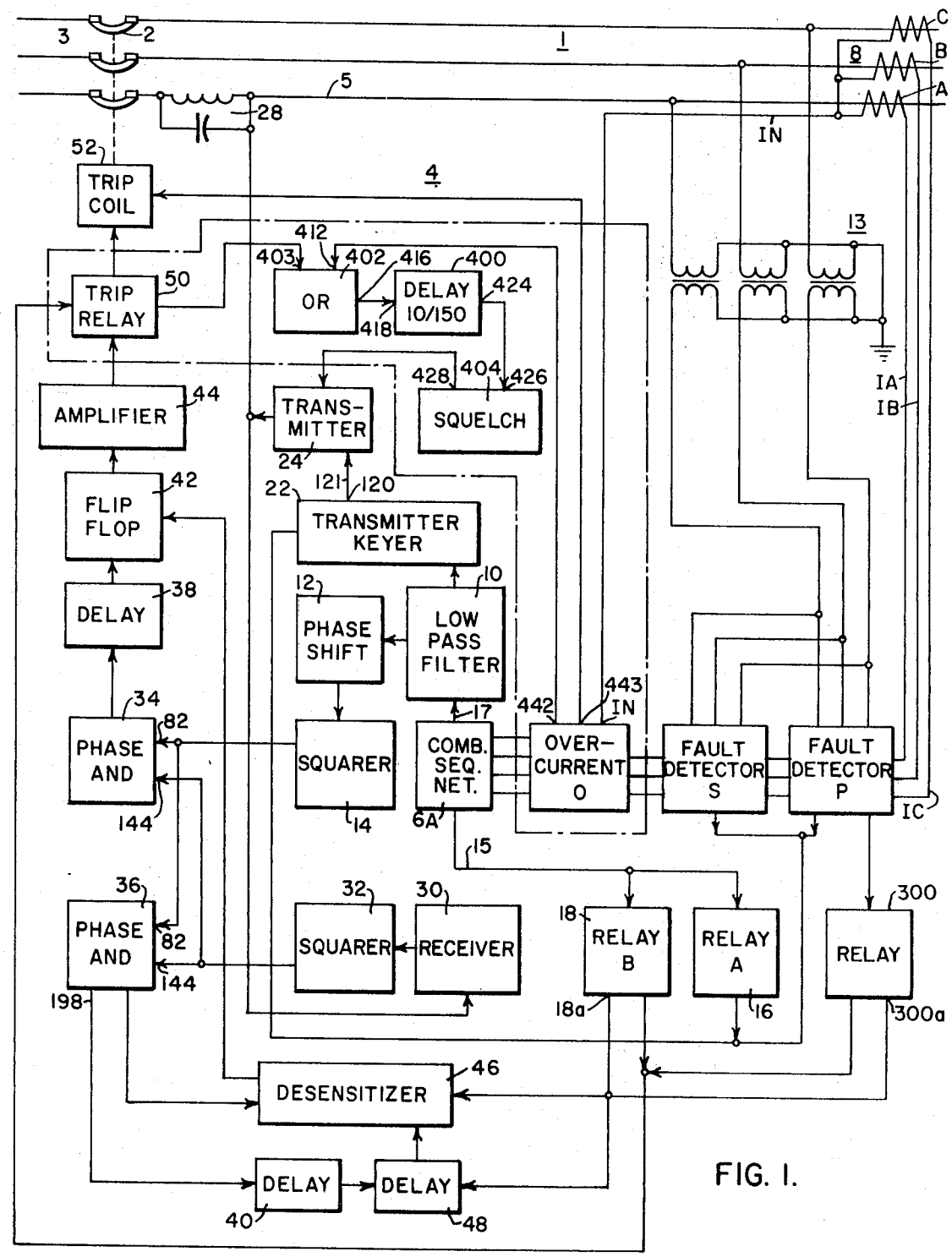
FIG. 1 is a block diagram showing an on-off type of carrier connected phase comparison network for protecting a section of a transmission line and embodying the invention.

This invention as illustrated in FIG. 1 shows a phase comparison relaying device similar to that set forth in my Pat. No. 3,312,866, dated Apr. 4, 1967. Insofar as possible, the same reference characters as were used in that patent are used herein. Since the details of much of the circuitry suitable for use in the blocks illustrated in this application are the same as that illustrated in my said patent and since the details form no part of this invention, such details and much descriptions found in that patent will not be repeated in this application and are embodied herein by reference.

Referring to the drawings by characters of reference, the numeral 1 illustrates generally a protected section of a three-phase power transmission network connected at a local terminal or station L by a local breaker 2 to power supplying busses 3. The operation of the local breaker 2 is directly controlled by a local apparatus or device 4. The line section 1 is similarly connected to terminal or station R by other power energized busses through a remote breaker 2. The remote breaker 2 and remote device 4 are identical to their local counterparts and only the local set is shown herein. The breakers 2 are jointly controlled by the pair of relaying devices 4 located at the local and remote terminals of transmission line section 1.

The local relaying device 4 which is located at the local end of the line section 1 controls the local breaker 2 by means of current and voltage signals derived from the line section 1 by means of current and voltage transformer arrays 8 and 13 and by the signals received by the local receiver 30 after transmission over the conductor 5 from the remote transmitter 24 at the remote end R of the line section 1. The signals from the transmitters 24 are prevented from passing through the breaker 2 to the busses 3 by a network 28. The network 28 is tuned to pass power at the power frequency which in the United States is usually 60 Hertz, but not to pass the signal from the transmitters.

The device 4 includes fault detecting networks P, S and O. The networks S and P are of the type known as distance relays and may be of the type illustrated in my said patent. They are energized with voltage and current signals from the line section 1 in the usual manner. The network 0 is a fast acting overcurrent network actuated by line current at the terminal to which it is connected. It is set to operate at line current values indicative of a close-in fault and which values are above any normal line current.

The fault signals from either the network S or network P render the transmitter keyer 22 effective to initiate the operation of the transmitter 24 in response to the occurrence of a fault. The operation of the keyer 22 may also be initiated by the relay 16 when the magnitude of the output signal from the network 6A reaches a critical magnitude. For this purpose, the unidirectional signal output thereof as derived from the output conductor 15 is used to energize the relay 16.

The transmitter keyer 22 is supplied with an alternating potential signal through the low pass filter 10 from the alternating potential output conductor 17 of the sequence network 6A. This alternating potential signal causes the transmitter 24 to transmit an output signal only during alternate half cycles of the current flowing in the transmission line 1.

The combination sequence network 6A also has its alternating-current signal conductors 17 connected to the local squarer 14 through the low pass filter 10 and the phase shift network 12. As explained more fully in my said patent, this results in the energization of the input terminal 82 of each of the phase AND networks 34 and 36 during the same alternate half cycle as the transmitter 24 is actuated to transmit its output signal.

The local device 4 is provided with a receiver 30 tuned to the transmission frequency of the transmitter at the remote station. This remote transmitter 24 is effective to transmit at alternate half cycles under control of the remote sequence network. The receiver 30 energizes a squarer 32 which amplifies and squares the received signal and which is located in the local device 4. The output of this squarer is connected to energize the input terminals 144 of the phase AND networks 34 and 36. The sequence networks 6A are interconnected with their respective elements such that when a fault occurs external to the line section 1 and the fault current at each terminal has substantially the same percentage makeup of sequence current components, the output signals of the sets of squarers 14 and 32 occur in sequence to provide a substantially continuous energization of the output terminals thereof. If the fault is within the line section 1, the output signals of the sets of squarers 14 and 32 will occur at substantially the same half cycle so that the output terminal of the squarers are energized only during alternate half cycles of the line current.

Figure 7:
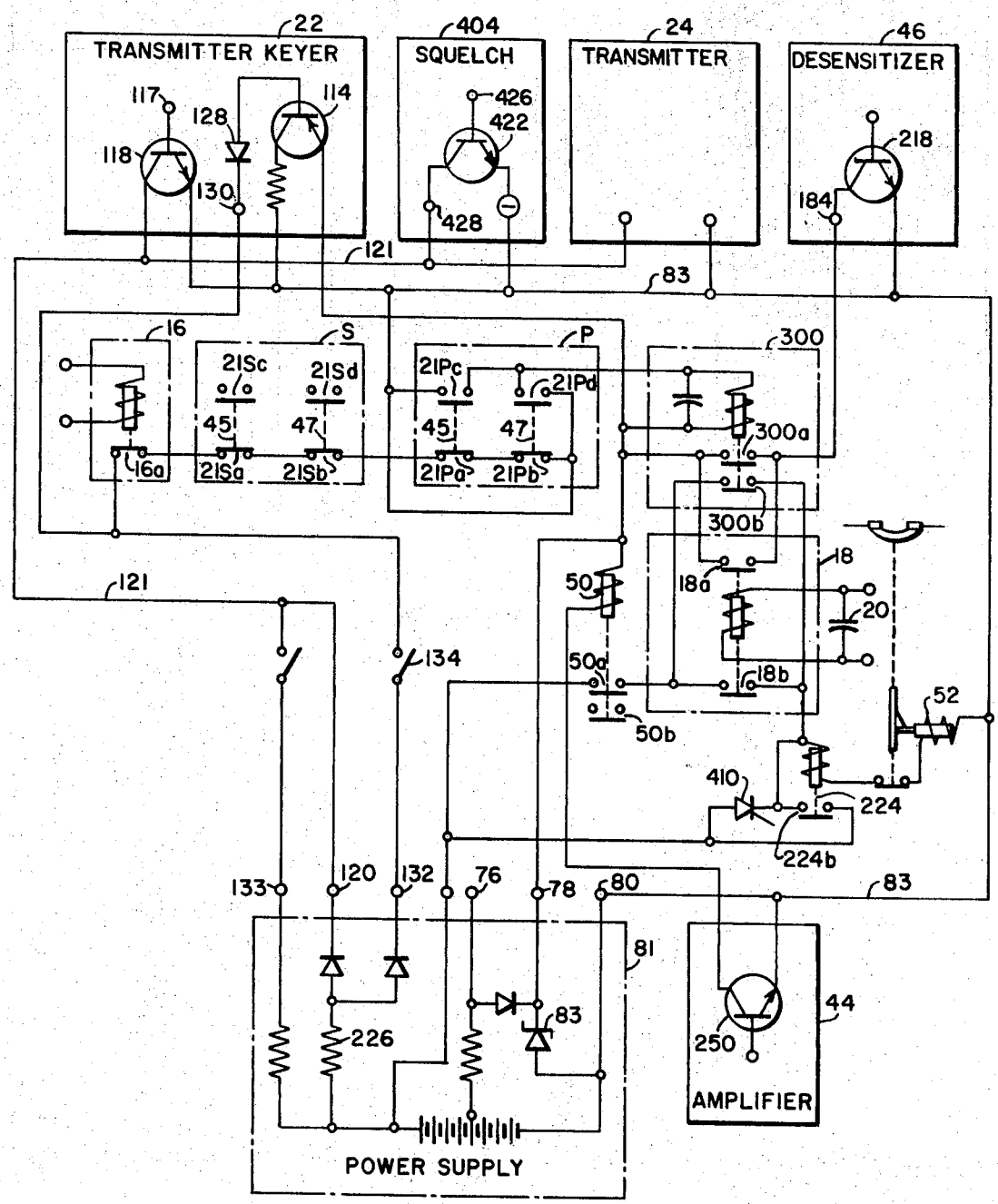
FIG. 7 is a partial block and partial schematic diagram showing in greater detail certain of the features embodied in FIG. 1.

The local sequence network 6A also has its unidirectional output conductors 15 connected to energize the relay 18. As indicated in FIG. 7, the relay 18 has a timing capacitor 20 connected across its winding to insure that the relay 18 will not be operated to close its contacts 18a and 18b until after at least one of the remote relay 16 or fault detectors S or P has been actuated to actuate the transmitter keyer 22. Actuation of the relay 18 causes the desensitizer 46 in FIG. 1 to sensitize the flip-flop 42 whereby it can flip upon timing out of the delay network 38. If the signals to the AND network 34 are coincident (an internal fault condition), the network 34 will initiate the timing period of the delay 38. This period should be at least as long as the time period of any space between the signals supplied to the inputs 144 and 82 of the network 34 during alternate operation of the squarers 14 and 32. A 4 ms. delay is quite satisfactory for a 60 Hertz network. When the delay 38 times out the flip-flop 42 flips to energize the amplifier 44, the trip relay 50 and the trip coil 52 to trip the breaker 2 whereby the line section 1 is disconnected from busses 3 in response to the internal fault.

Figure 3:
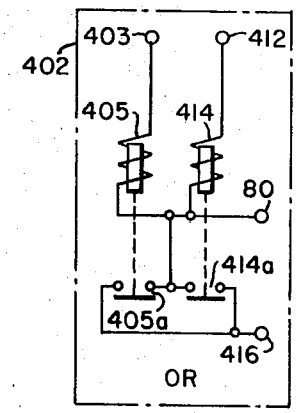
Figure 5:
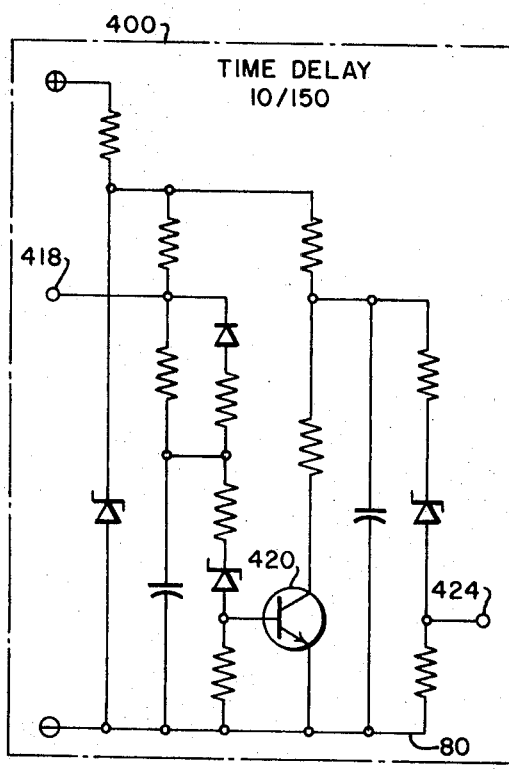
Figure 4:
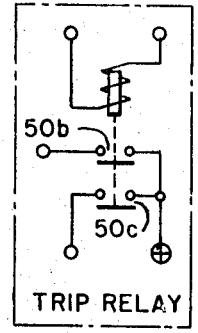
Figure 6:
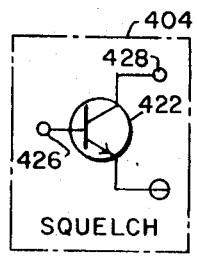

As shown in FIG. 4, the trip relay 50 of this application distinguishes from that of the relay 50 of my said patent in that it is provided with additional normally open contacts 50b which along with the contacts 50a close when the relay 50 is energized. FIG. 1 shows the interconnections between the various schematically shown circuits of FIGS. 2, 2A, 3, 4, 5 and 6. Closure of the contacts 50b provides a signal at the terminal 403 of the OR network 402. This energizes the relay 405 which closes its normally open contacts 405a to connect the OR network output terminal 416 to the negative battery terminal 80. This terminal 416 is connected to the input terminal 418 of the time delay network 400. With this terminal 418 at the potential of battery terminal 80, the normally conductive transistor 420 turns off to raise the potential of its output terminal 424. This terminal 424 is connected to the base terminal 426 of the transistor 422 of the squelch network 404 so that the transistor 422 becomes conductive to reduce the potential of the output terminal 428 to substantially that of the conductor 80. The delay network 400 as indicated by the designations 10/150 provides an energizing delay of 10 milliseconds before an output signal is provided to energize the squelch network 404. The network 400 also provides a 150 ms. delay before the output signal is terminated after its deenergization to maintain the energization of the squelch network 404. The terminal 428 of the squelch network 404 is connected to conductor 121 (FIG. 7). Therefore conduction of transistor 422 terminates further operation of the transmitter 24 and will maintain the squelch network 404 effective for 150 milliseconds after deenergization of the OR network 402.

The squelch network 404 when actuated by the phase comparison operation of the network is, except for the inclusion of the time delay network 400, quite similar to the squelch network 124 of the Altfather patent. The chief difference between the two is that in the Altfather patent the squelch network is initiated without time delay by the relay 224 after the relay 50 is actuated. In this application the squelch network 404 is actuated after a desired time delay established by the delay network 400 after the trip relay 50 is actuated.

Energization of the relay 18 also initiated a timing operation of the delay 48 which at the end of its predetermined interval actuates the desensitizer 46 to desensitize the flip-flop and prevents its actuations by the delay network 38. This actuation in the case of an internal fault is without effect since the flip-flop will already have been actuated by the delay network 38. In the event of an external fault, in which the delay network 38 will not have timed out, the desensitizing of the flip-flop 42, prevents any false actuation thereof by the delay network 38 which might occur due to transients caused by the actuation of breakers on other sections of the line.

If an internal fault should occur subsequent to the desensitizing of the flip-flop 42 the phase AND network 36 will be provided with a half-wave signal at its output terminal 198 which causes the delay network 40 to commence to time out. When timed out, the delay network 40 actuates the delay network 48 to terminate the desensitizing actions of the desensitizer 46 to desensitize the flip-flop 42. When resensitized, the flip-flop 42 will again respond to the output signal of the delay network 38 which because of the substantially continuous signal at the input terminals of the AND network 34 either will have or subsequently will cause the flip-flop 42 to flip and energize the amplifier 44, trip relay 50, and trip coil 52 to open the breaker 2.

Figure 2A:
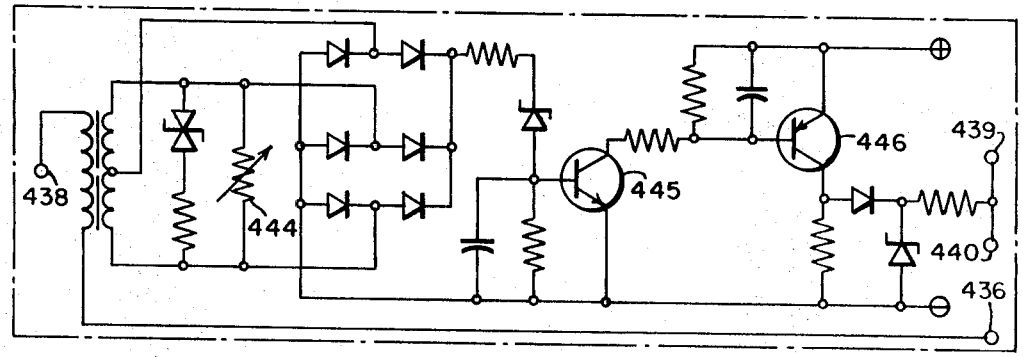
FIG. 2A shows, in schematic form, a circuit for use in one of the blocks of FIG. 2.
Figure 2:
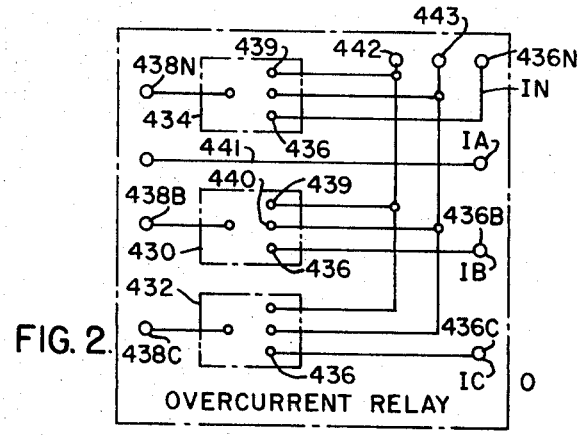
FIGS. 2, 3, 4, 5 and 6 show, in schematic form, typical circuitry for use in certain of the blocks of FIG. 1.

Additionally I provide a fast acting overcurrent relay 0 which may be of any desired type and may for example be of the type shown in FIGS. 2 and 2A. The relay 0 as illustrated is a type sold by Westinghouse Electric Corporation under the type designation SIU. It comprises a pair of phase current sensing circuits 430 and 432 and a common current sensing circuit 434. All of the sensing circuits are identical and may take the form illustrated in FIG. 2A. Each circuit has input connections 436 and 438 and output connections 439 and 440.

The input connections 436B and 438B connect the circuit 430 in series with the current transformer B which measures the B phase current as indicated by $I_B$, the input connections 436C and 438C connect the circuit 432 in series with the current transformer C which measures the C phase current as indicated by $I_C$, and the input connections 436N and 438N connect the circuit 434 in series with the neutral current $I_N$ in the common conductor of the current transformer array 8. The A phase current $I_A$ passes through the network 0 by means of the conductor 441. The output connections 439 are connected to a common output terminal 442 and the output connections 440 are connected to output terminal 443. With the above construction, the occurrence of a current greater than a predetermined magnitude as determined by the adjustment of the resistor 444 results in the conduction of the transistor 445 of the respective current sensing circuit. This conduction causes its companion transistor 446 to conduct and raise the potential of both output terminals 442 and 443. In the event of a close-in fault sufficient fault current will flow to cause energization of the terminals 442 and 443. The terminals 443 and 442 are connected respectively to the gate of the thyristor 410 (FIG. 7) associated with the trip coil 52 and to the OR network 402. The thyristor 410 is connected in shunt circuit with the contacts 224b of the holding relay 224 which in turn is connected in series with the trip coil 52 so that when the signal is supplied, the thyristor 410 conducts to energize the trip coil 52 which actuates the breaker 2 to its open circuit condition.

The output terminal 442 is connected to the input terminal 412 of the OR network 402, shown schematically in FIG. 3, and energizes its relay 414. When energized, the relay 414 closes its contacts 414a to connect the output terminal 416 of the OR network 402 circuit to the negative battery terminal 80. Since the terminal 416 is connected to the input terminal 418 of the time delay network 400 (FIG. 5) to render the transistor 420 nonconducting to initiate a timing function as described above in connection with its operation in response to the operation of one of the fault detectors S and P. At the end of the time delay interval, the potential of the output terminal 424 increases sufficiently to initiate the conduction of the transistor 422 of the squelch network 404. This removes the operating potential from the transmitter 24 and terminates the signal transmission through the line conductor 5 to the remote terminal. With no transmitted signal, the phase AND circuits 34 and 36 of the remote device 4 will actuate the remote breaker 2 to disconnect the line section 1 from the busses at the remote terminal.

Figure 8:
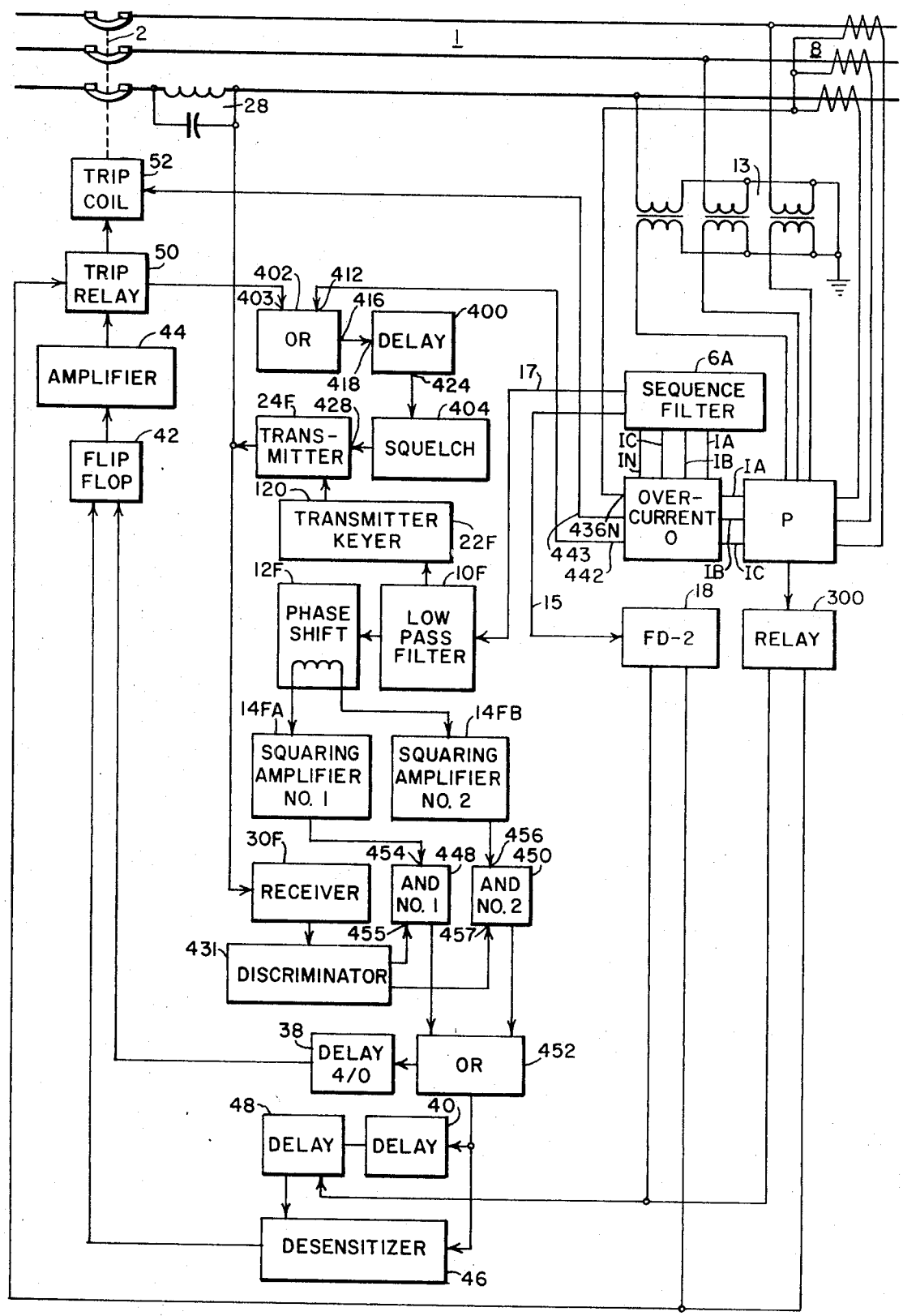
FIG. 8 is a block diagram showing the invention as applied to a frequency-shift form of phase comparison protection relaying network which utilizes the so-called frequency-shift transmitter for transmitting information between the remote and local stations.

FIG. 8 shows in a block form a phase comparison protecting network in which a frequency shifting transmitter 24F is utilized to transmit operating signals between the remote and local terminals or stations. In this form, the transmitter 24F is continually actuated by the transmitter keyer 22F to supply "space" and "mark" signals instead of being actuated by the keyer solely in the event of the occurrence of a fault as in the ON-OFF type of phase comparison protective relaying network illustrated in FIG. 1. In the form illustrated in FIG. 8, the fault detector S is not used. When fault current flows in the line section 1 one or both of the fault detector P and the sequence network 6A act to energize the relay 300 and 18 respectively. When actuated, each of the relays 300 and 18 establish a preparatory circuit in the trip relay 50 and actuate the desensitizer 46 to sensitize the flip-flop 42 and place it under control of the delay network 38. Each of these relays furthermore establish an initiating circuit for the delay network 48 which, if it times out as described above will actuate the desensitizer 46 to desensitize the flip-flop 42.

Figure 9:
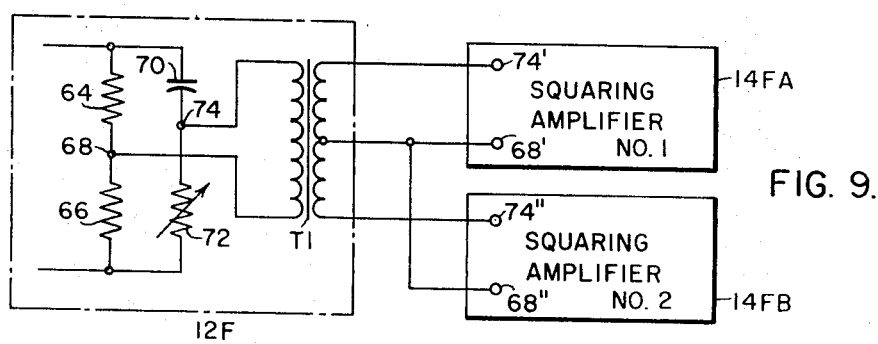
FIGS. 9, 10, 11 and 12 show in schematic form the circuitry of certain of the blocks used in the diagram of FIG. 8.
Figures 10, 11, 12:
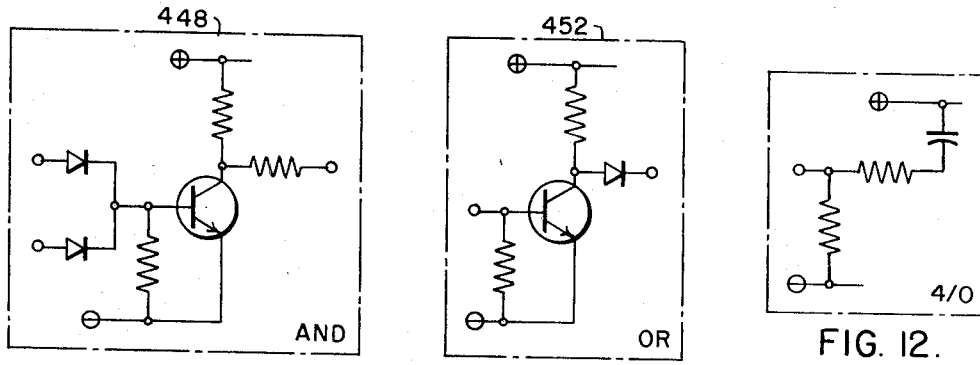
Figure 13:
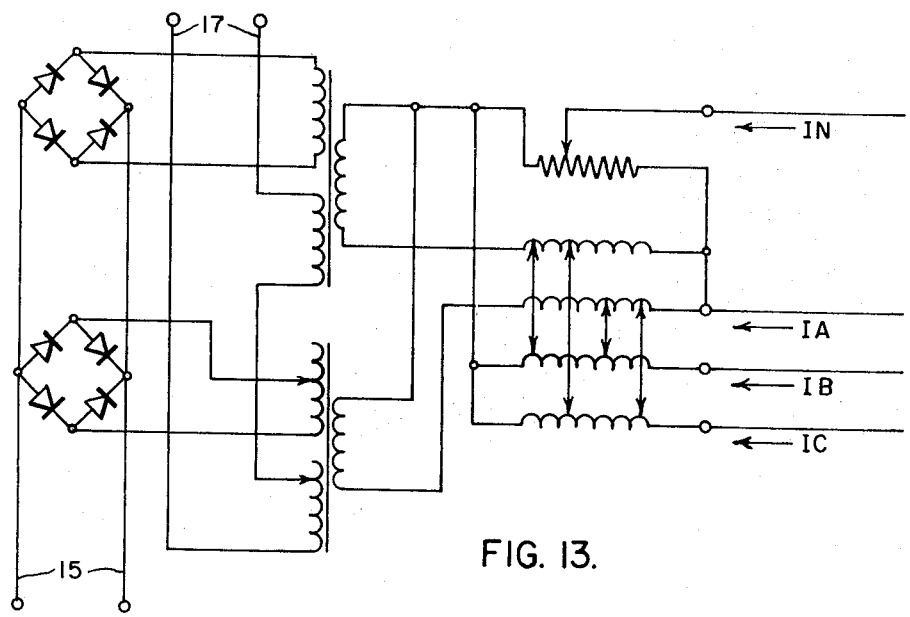
FIG. 13 is a schematic diagram showing a sequence filter network suitable for use in the apparatus of FIGS. 1 and 8.

The alternating potential conductor 17 of the sequence network 6A is connected to the low pass filter 10F. One output connection of the low pass filter 10F is connected to the transmitter keyer 22F for operating the transmitter 24F to provide a "space" signal during one half cycle of the output signal of the network 6A and a "mark" output signal during the opposite half cycle of this output signal from the network 6A. The other output connection of the low pass filter 10F is connected to a phase shift network 12F which is similar to the network 12 in FIG. 1 but which is provided with an output transformer T1 having a center tapped secondary (shown more completely in FIG. 9). The opposite end terminals are connected to squaring amplifiers 14FA and 14FB for actuation thereof during opposite half cycles of the output signal of the sequence network 6A. Input terminals 454 and 456 of the AND networks 448 and 450 are individually connected to the squaring amplifiers 14FA and 14FB respectively. The other input terminals 455 and 457 of the AND networks 448 and 450 are individually connected to opposite output terminals of a discriminator 431. The discriminator provides output signals in accordance with the reception by the receiver 30F of the space and mark signals and may be of the type shown and described in the "Handbook of Instructions" published by Radio Frequency Laboratories Incorporated, Boonton, N.J. which describes their model 1220 telegraph terminal and which handbook contains a 1959 copyright notice. U.S. Pat. to Lensner No. 2,897,406 shows a frequency shift carrier distance relay network which embodies a frequency shift transmitter and receiver which transmits and receives space and mark signals. As disclosed in the Lensner patent a mark frequency is transmitted when the conductor is at ground potential and a space signal is transmitted when the conductor 15 is at an elevated potential. The control between ground and elevated potential is accomplished herein by the keyer 22F which, as is more completely shown in my said Pat. No. 3,312,866 and in FIG. 7 hereof, has the collector of its output transistor 118 connected to the power supply terminal 120 and its emitter connected to the negative or ground terminal 80. Therefore with the transistor 118 in its nonconducting state the input conductor 121 to the transmitter 24F will be at a positive potential and with the transistor 118 in its conducting state the conductor 121 will be at ground or negative potential. The squelch transistor 422 (FIG. 6) is similarly connected between the terminals 120 and 80 and if conducting will maintain the conductor 121 at the potential of the terminal 80 independently of the transistor 118 as shown in FIG. 7 hereof and in FIG. 8 of the said Altfather patent.

The discriminator 431 is energized by the output signal of the frequency shift receiver 30F which receives the output signal of the frequency shift transmitter 24F located at the remote station. During the period that the frequency shift transmitter transmits the space signal, the discriminator 431 energizes the terminal 455 of the AND network 448 and during the period that the "mark" signal is received, the discriminator energizes the input terminal 457 of the AND network 450.

The phasing of the signals from the discriminator 431 and from the squaring amplifiers 14FA and 14FB is such that the signals supplied to the AND networks 448 and 450 are effective to cause them to supply a control signal to the OR network 452 when the fault is located in the line section 1 in substantially the same manner as described in connection with FIG. 1.

When energized by either of its inputs, the OR network 452 energizes the delay network 38 to time out a time interval which preferably is 4 milliseconds. After its timing period the network 38 will supply a flipping signal to the flip-flop network 42, in the manner as previously described to actuate the amplifier 44, the trip relay 50, and the trip coil 52 to open the breaker 2. More specifically if the squaring amplifier 14FB supplies its output signal to the input 456 of the AND network 450 at the same time a mark signal is being supplied to the input 457 by the discriminator 431 or the squaring amplifier 14FA supplies its output signal to the input 454 of the AND network 448 when a space signal is being supplied to the input 455 by the discriminator 431, the OR network 452 will cause the delay network 38 to time out and actuate the flip-flop 42.

Whenever the trip relay 50 is actuated, it closes its contacts 50b to energize the input terminal 403 of the OR network 402. This energizes the delay network 400 to time out its timing interval and at the end of the interval the squelch network 404 will act to maintain the conductor at ground potential to place the transmitter in a condition to send continuously a space signal as described above.

In the event that the fault is external to protected section, the flow of fault current at the remote terminal will be of a different phase with respect to the flow of the fault current at the local terminal and the discriminator 431 will not supply signals phased to time out the delay 38 and the flip-flop 42 will not be flipped. Under these conditions the delay network 48 will be actuated to desensitize the flip-flop 42. As described above in connection with FIG. 1, the occurrence of a subsequent internal fault causes the OR network 452 to time out the delay network 40 and actuate the delay 48 to resensitize the flip-flop 42 to permit its operation to protect the line section 1.

In the event of a close-in fault, indicated by an extremely high current in the line section 1 adjacent the local breaker, a trip signal will be supplied directly from the output terminal 443 of the overcurrent relay 0 to the thyristor 410 for actuating the local breaker 2 to disconnect the line section 1A from the bus 3. The other output terminal 442 of the overcurrent network 0 will energize the OR network 402 which initiates a timing interval of the delay network 400. At the expiration of the timing interval, the squelch network 404 causes the frequency shift transmitter 24F to send a "space" signal. If the time out occurs during a natural "mark" period, this transmission will terminate and a "space" signal will be initiated as shown in FIG. 14 (trace 508R at time $t_8$) to actuate the AND network 448 at the remote station to initiate a timing out of the remote delay 38 after which the remote flip-flop 42 is actuated for opening of the remote breaker 2.

Figure 14:
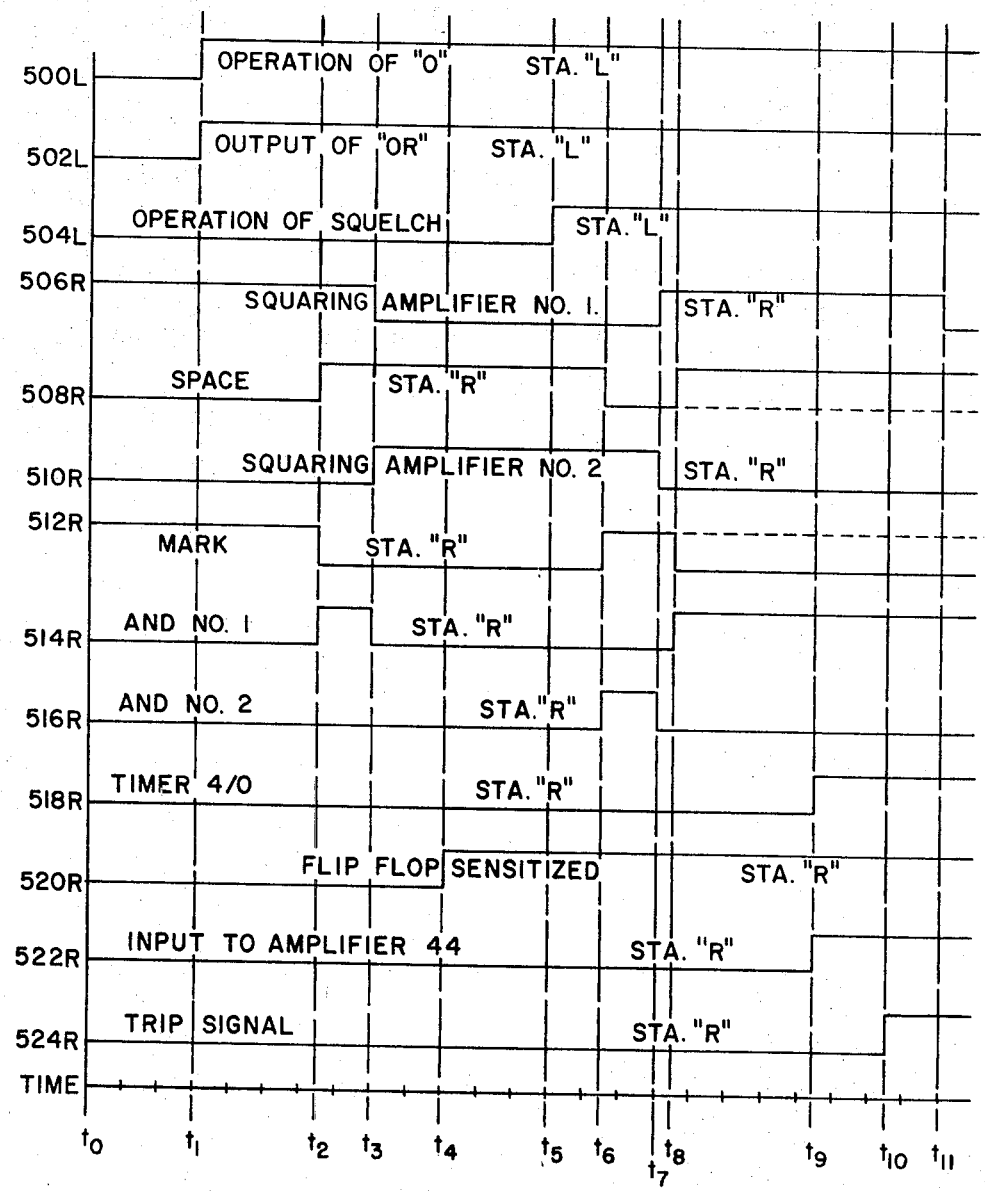
FIGS. 14 and 15 illustrate by means of traces of the operation of my invention.

Referring in detail to FIG. 14, when related to the block diagram of FIG. 8, the abscissa represents time increasing in a direction from left to right. The equally spaced marks along the abscissa represent time in milliseconds with to representing the time of the occurrence of a close-in fault. The raised portions of the traces represent the actuated or energized conditions (logic 1). The apparatus of FIG. 1 can similarly be represented by the traces of FIGS. 14 and 15.

The traces 506R and 510R represent the time intervals that the squaring amplifiers 14FA and 14FB at the remote station are energized by the alternating potential signal derived from the remote sequence network 6A and at a phase determined by the phase shift network 12F. Similarly the space and mark signals at the remote station R are represented by the traces 508R and 512R respectively. The local sequence network 6A controls the local transmitter keyer and controls the local transmitter 24F to provide "space" signals during one half cycle of its single phase alternating output and "mark" signals during the opposite half cycles. The local keyer 22F keys the local transmitter 24F and the remote phase shift network 12F phase shifts the output signal from the remote sequence network 6A such that under nonfault operation conditions of the protected line section 1, the "space" and "mark" signals resulting from load current in general will be in phase with the output signals of the remote squaring amplifiers 14FA and 14FB respectively so that there will be no usable output from the AND networks 448 and 450. Any slight out-of-phase condition of the signals may cause the AND networks 448 and 450 to energize the delay network 38 for brief intervals but such intervals will be too short to permit the networks 38 to time out and no flip signal will be supplied to the remote flip-flop 42.

When a fault occurs external to the protected line section 1, the relative phase of the output current of the sequence networks 6A at the local and remote stations will not change substantially and the breaker 2 will not be tripped. When an internal fault occurs, the fault power flows inwardly at each station resulting in a change in the relative phase of the alternating output signals of the local and remote networks 6A.

This phase change will be variable depending upon the location of the fault. This results from the fact that the alternating potential output of the filter network 6A is a combination of the positive, negative and zero sequence current flowing in the line sections at the location of the current transformer array 8 which energizes the particular sequence network. Assuming a fault, close-in to the local station, the composition of the sequence current at the local station can be quite different from the compositions at the remote station. This results in an output signal of the remote networks 6A in which the phase of the "space" segment is neither in-phase nor 180° out-of-phase with the output signal of the remote squaring amplifier 14FA. Likewise the phase of the "mark" signal is neither in-phase nor 180° out-of-phase with the signal of the remote squaring amplifier 14FB.

FIG. 14 represents a condition which may exist for a fault close-in to the local station and in which the fault current flowing at the local station is of sufficient magnitude to provide output signals to the local trip coil 52 and local OR network 402 to trip the local breaker 2. The trace 500L indicates the operation of the overcurrent relay "0" at the local station and indicates that it is actuated at time $t_1$. As illustrated this occurs 3 ms. after the occurrence of the fault shown at time $t_o$. The time interval between the occurrence of the fault and the actuation of the relay "0" will vary depending upon the incidence and magnitude of the voltage at the instant the fault occurs. This time can be as low as 0.5 ms. or as long as 8 ms.

At the time $t_1$, the relay "0" sends its signal to the local trip coil 52 and to the local OR network 402. The resultant energization of the trip coil 52 results in the tripping of the breaker 2 and the resultant energization of the output of the local OR network 402, starts the timing out of the initial 10 ms. timing interval of the time delay 400. This energization of the output of the local OR network 402 is shown by the trace 502L. At the end of the 10 ms. delay as indicated by trace 504L the local squelch network 404 is actuated. At the end of the "channel" time, a space signal will be received at the remote station and will be actuated the remote AND network 448, trace 516R, to provide the space signal at the time $t_8$. By "channel" time is meant the time interval between the initiation of the squelch signal at the local station for terminating further transmission of the "mark" signal and the occurrence of the "space" signal at the remote receiver. This has been indicated by the trace 508R as being the 3.5 ms. interval $t_5—t_8$.

At the time the "space" signal, trace 508R, is reestablished, time $t_8$, the remote squaring amplifier 14FA is supplying its signal, trace 506R, and the associated remote AND network 448 provides its output signal as indicated by the trace 514R. The output signal of the remote network 448 causes the remote OR network 452 to initiate the timing out of the remote delay network 38. A normal delay interval is 4 ms. so that 4 ms. later or at the time $t_9$, trace 518R, the remote network 38 times out. The remote flip-flop was sensitized at the time $t_4$, trace 520R, so that at the time $t_9$, the remote flip-flop 42 is actuated to energize the amplifier 44, trace 522R, whereby at the time $t_{10}$, trace 524R, the trip signal is supplied to the trip relay 50 and trip coil 52 for opening of the remote breaker 2.

The delay 38 has a 4 ms. time interval between the energization thereof by the OR network 452 and its actuation of the flip-flop 42 as described but it has no appreciable time delay between the time of its deenergization by the OR network 452 and the rendering of the delay 38 to its initial or set condition. Therefore if the delay 38 is to timeout, the input signal must exist for a full 4 ms. interval. As indicated by the traces 514R and 516R, the intervals during which the AND networks 448 and 450 energize the OR network 452 is only of about 1.5 ms. (time $t_2—t_3$ and time $t_6—t_7$). This interval is obviously less than 4 ms. and therefore, unless the local transmitter 24F is squelched, no tripping can occur at the remote station. With a close-in fault at the local station, the fault current at the remote station is insufficient to actuate the remote overcurrent relay "0" and (as indicated by the traces 514R and 516R which show the outputs of the remote AND networks 448 and 450, respectively) the remote breaker, if it is to trip, must trip in response to the application of a space signal. This space signal must be concurrent with the output signal of the remote squaring amplifier 14FA for at least the 4 ms. time delay period of the delay 38.

If the delay interval of the network 400 is increased much beyond 13 ms., the space signal would not be present for more than 4 ms. before the time $t_{11}$. Under such a condition, the remote delay network 38 would not timeout at or before the time $t_{11}$ and the flip-flop 42 could not be flipped to energize the remote breaker 2 until at least 12 ms. later.

Figure 15:
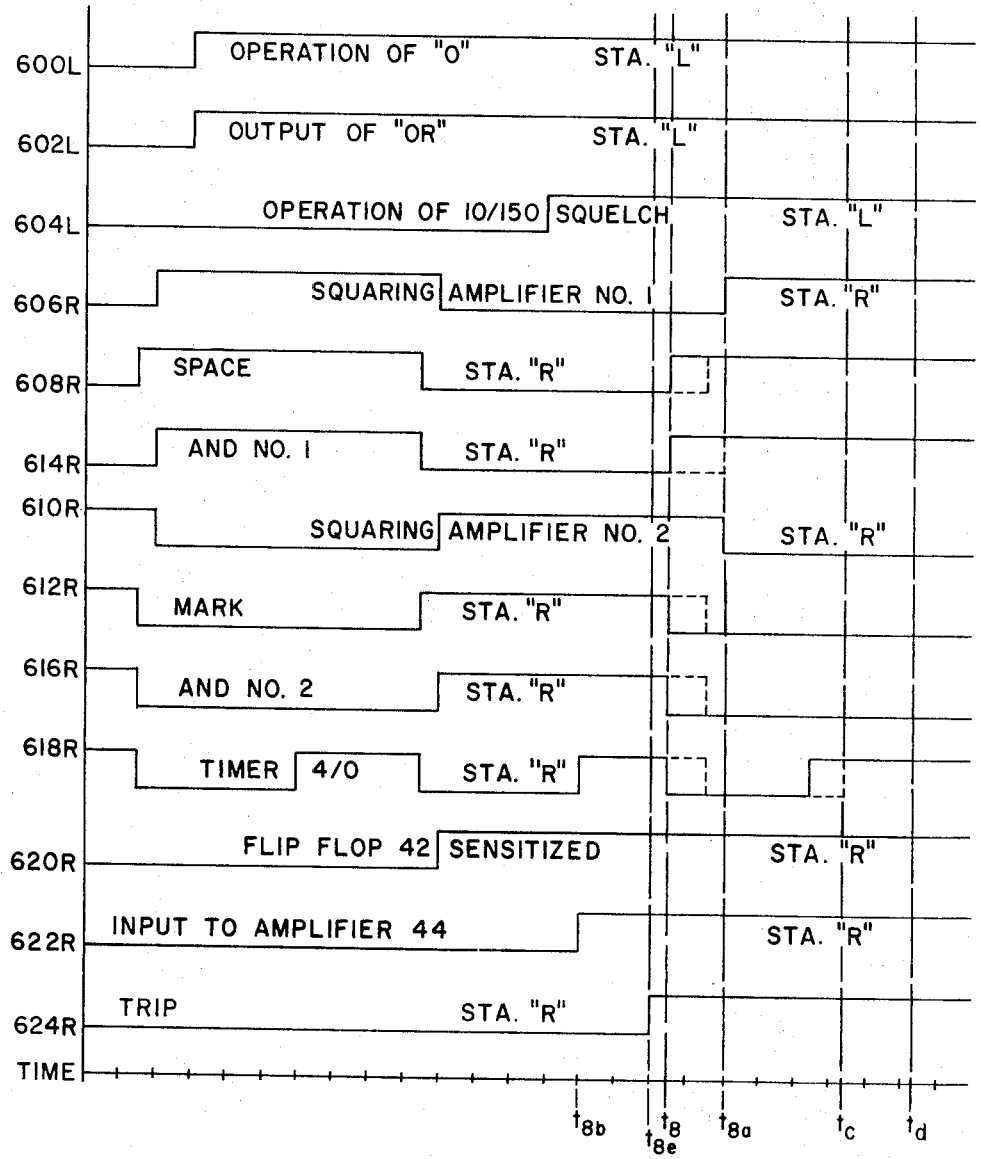

FIG. 15 illustrates a fault condition in which the sequence composition of the current at the local and remote stations L and R is substantially identical and in which the fault power is flowing into the line section 1 at each station. It will be apparent from a study of these traces that a delay time interval of the delay 400 of less than 8 ms. will introduce a trip delay greater than that which would result from a 10 ms. delay provided for the squelch delay 400.

The traces in FIG. 15 are numbered 100 units above the corresponding traces of FIG. 14. The traces 600L, 602L and 604L show the same relative operating times of the local elements at the local station L. In FIG. 15 the output signal of the remote squaring amplifier 14FA, trace 606R, and the space signals, trace 608R, at the remote station are substantially in-phase as are the output signals of the remote squaring amplifier 14FB, trace 610R, and the mark signals, trace 612R. With the assumed channel delay of 3.5 ms., the remote space signal, trace 608R, will occur at $t_8$ instead of $t_{8a}$ where it would otherwise occur if the operation of the local transmitter 24F had not been squelched.

If the delay of the local network 400 were to be reduced to a time interval much less than 8 ms., the "mark" signal, trace 612R, would disappear and the output signal of the AND network 450 would terminate prior to the timeout time of the remote delay timer 38, time $t_{8b}$. This timer 38 has substantially a zero reset time and will substantially immediately reset. It will not start a subsequent timing operation until the occurrence of an output from the remote AND network 448 due to concurrence of the signal from the remote squaring amplifier 14FA, trace 606R, and "space" signal, trace 608R. The signal, trace 606R, cannot reoccur until the time $t_{8a}$ so that the remote fliplop 42 cannot be actuated prior to 4 ms. thereafter, time $t_c$, which is 8 ms. later than would occur with a 10 ms. delay.

Since numerous changes may be made in the above-described apparatus and different embodiments of the inventions may be made without departing from the spirit thereof, it is intended that all matter contained in the foregoing description and shown in the accompanying drawings, shall be interpreted as illustrative and not in a limiting sense.

What I claim and desire to be secured by United States Letters Patent is as follows:

1. A protecting relay for a protected section of a transmission line which is connected to a source of power through an openable switch comprising, first and second fault sensing networks operable to be connected to the transmission line at a selected location, said first sensing network being operable to perform its function in response to the occurrence of faults solely in a first length of transmission line section to which the relay may be connected, said second sensing network being operable to perform its function in response to the occurrence of faults which occur at least in a second length of the transmission line section to which the relay may be connected, at least a portion of said second length being spaced from said selected location by said first length, a receiver operable to provide a first signal, a transmitter, a switch actuating device, first means connecting said switch actuating device to said first sensing network for actuation of said switch actuating device, said first means being rendered effective to actuate said switch actuating device solely as a consequence of the occurrence of said function of said first sensing network and independently of said signals, means providing a second signal, signal comparing means energized by said signals, second means connecting said switch actuating device to said second sensing network and including said signal comparing means, said second means being effective to actuate said switch actuating device in response to the occurrence of said function of said second sensing network solely at predetermined relationships of said signals, third means connecting said second sensing network to said transmitter and effective as a consequence of the occurrence of said function of said second sensing network to render said transmitter ineffective to transmit said signal, and fourth means connected to said transmitter and effective as a consequence of the occurrence of said function by said first sensing network to render said transmitter ineffective to transmit said signal.

2. The combination of claim 1 in which delay means is provided in at least one of said third and said fourth means to delay the rendering of said transmitter ineffective by said one sensing network as a consequence of the occurrence of its said function.

3. The combination of claim 2 in which said delay means provides a 10 millisecond delay.

4. The combination of claim 2 in which means is provided to establish an alternating quantity and the delay provided by said delay means is not less than one-half the period of said alternating quantity.

5. The combination of claim 2 in which said transmitter is effective to transmit a third signal and a fourth signal, means is provided to maintain said transmitter in a condition to transmit said third signal in the absence of said function of either of said sensing network, said first means being effective in response to the occurrence of said function of said first sensing network to cause said transmitter to interrupt at least in part the transmission of said third signal and to provide transmission of said fourth signal during said interruption.

6. The combination of claim 5 in which means is provided to establish an alternating quantity, said first means is effective during the occurrence of said function of said first sensing network to interrupt said third signal and provide said fourth signal for alternate half periods of said alternating quantity, and in which the delay provided by said delay means is not less than a half period of said alternating quantity.

7. The combination of claim 1 in which means is provided to establish an alternating quantity, said transmitter is normally maintained ineffective to transmit a signal and said operating condition of said transmitter is the transmission of its said signal during alternate half periods of alternating quantity.

8. The combination of claim 1 in which said second sensing network is responsive to the magnitude of the fault current at said location.

9. The combination of claim 1 in which there is provided fifth means actuated by said first sensing device to render said transmitter ineffective to transmit.

10. The combination of claim 9 in which fifth means includes said switching actuating device.

11. A protective relay network for protecting a section of a transmission line having a first disconnecting switch arranged at one end of the line section comprising, a first actuating network operable to be connected to said line for receiving line operating signals, said first actuating network including a first line fault sensing device for actuation by said signals to detect faults in the line section at current magnitudes below a first magnitude and a second fault sensing device for actuation by said signals to detect faults in the line section at magnitudes solely greater than said first magnitude, said network also including an information transmitting device for communication with the protective network at the other end of the line section, said network further including an information receiving device and an information comparing device, said first actuating network further including means operatively interconnecting said first fault sensing device to said transmitting device for actuating said transmitting device into a condition to transmit first information and to supply information to said comparing device in response to the sensing of a line fault by at least one of said fault sensing devices, means connecting said receiving device to said comparing device for supplying information thereto, a tripping means, first circuit means operative connecting said second fault sensing device to said tripping means for actuation of said tripping means independently of said comparing means as a consequence of the occurrence of a fault in the line section, second circuit means operatively connecting said first fault sensing device to said tripping means for energization thereof and including said comparing device for energization of said tripping means solely at certain relationships of said supplied information, and third circuit means connected to said transmitter for interrupting the transmission of said first information as a consequence of the operation of either said first or said second fault sensing device.

12. The combination of claim 11 in which there is provided an OR network and a delay network, said tripping means includes a trip relay and a trip coil, said first circuit means connects said second fault sensing device to said trip coil and said third circuit means connects said second fault sensing device through said OR network and said delay network to said transmitter, said second circuit means connects said first fault sensing device to said trip relay and said third circuit means connects said trip relay through said OR network and said relay network to said transmitter.

13. The combination of claim 11 in which said second fault sensing device is a high speed current sensitive device effective in response to current which exceeds said predetermined minimum magnitude to actuate said first tripping means.

14. The combination of claim 11 in which said second fault sensing device is a voltage sensitive device effective in response to voltage which are below a predetermined minimum magnitude to actuate said first tripping means.

15. A protective relay network for protecting a section of a transmission line having a first disconnecting switch arranged at one end of the line section comprising, a first actuating network operable to be connected to said line, said first actuating network including a first line fault sensing device and a second fault sensing device for detecting faults and an information transmitting device, said first actuating network further including means operatively interconnecting said first fault sensing device to said transmitting device for actuating said transmitting device into a condition to transmit first information in response to the actuation of at least one of said fault sensing devices, a tripping means, means operatively connecting said first and second fault sensing devices to said tripping means for actuation of said tripping means as a consequence of the actuation of one of said fault sensing devices, means connecting said tripping means and said second sensing device to said transmitter for interrupting the transmission of said first information as a consequence of the operation of either said tripping means or said second device, said last-named connecting means including a time delay device for inserting a delay between the actuation of said transmitter to interrupt the transmission of said first information and the actuation of said last-named means by either said tripping means or said second sensing device.

16. The combination of claim 15 in which said delay is in the magnitude of 10 milliseconds.

17. The combination of claim 15 in which there is provided a source of alternating potential controlling at least in part the said information transmitted by said transmitter device, and in which said delay is greater than one half cycle of said alternating potential.